HANGER ASSEMBLY FOR SLIDING DOORS

Original Filed Sept. 22, 1960

INVENTOR

HENRY L. MAJESKE

BY Emory L. Groff

ATTORNEY

United States Patent Office

Re. 25,246
Reissued Sept. 25, 1962

25,246

HANGER ASSEMBLY FOR SLIDING DOORS

Henry L. Majeske, Loda, Ill., assignor to American Screen Products Company, Chicago, Ill., a corporation of Florida Original No. 3,011,209, dated Dec. 5, 1961, Ser. No. 57,682, Sept. 22, 1960. Application for reissue Apr. 19, 1962, Ser. No. 190,193

3 Claims. (Cl. 16—105)

Matter enclosed in heavy brackets [ ] appears in the original patent but forms no part of this reissue specification; matter printed in italics indicates the additions made by reissue.

This invention relates to a hanger assembly for sliding doors and particularly to pre-assembled units wherein the component parts are retained in unitary relationship to facilitate handling, installation and adjustment after installation.

In recent years the use of sliding doors in both residential and commercial building has increased considerably and one of the problems incident to the use of sliding doors has been to maintain them in satisfactory operation particularly after they have been subjected to hard use or when the building in which they are installed has settled, thus causing original tolerances of the framework or flooring to become out of plumb. Various means for adjusting the height of sliding doors to correct such problems have been devised; however, more often than not, they have been difficult to operate and control with any degree of accuracy and have created problems in handling and installation due to the fact that they consist of a plurality of separate and loose parts which are time consuming and tedious to install.

Accordingly, the main object of the present invention is to provide a prefabricated hanger assembly, which may be handled as a unit, for sliding doors including means for holding the component parts together prior to and during installation.

Another object of the invention is to provide means for locking the assembly in its adjusted position to prevent any shifting of parts after the desired adjustment is made.

With these and other objects in view, which will appear as the nature of the invention is better understood, the invention consists in the novel construction, combination, and arrangement of parts, hereinafter more fully described, illustrated and claimed.

Figure 1:
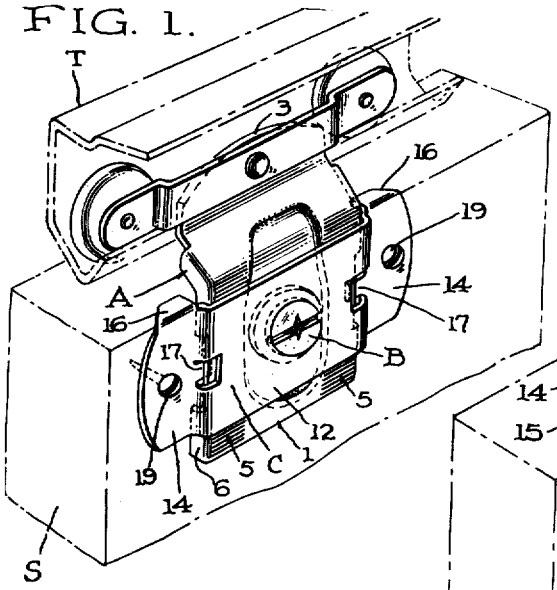
FIGURE 1 is a perspective view of the inside of a portion of a door to which the hanger assembly has been affixed showing the rollers of the assembly seated in a typical track section.
Figure 2:
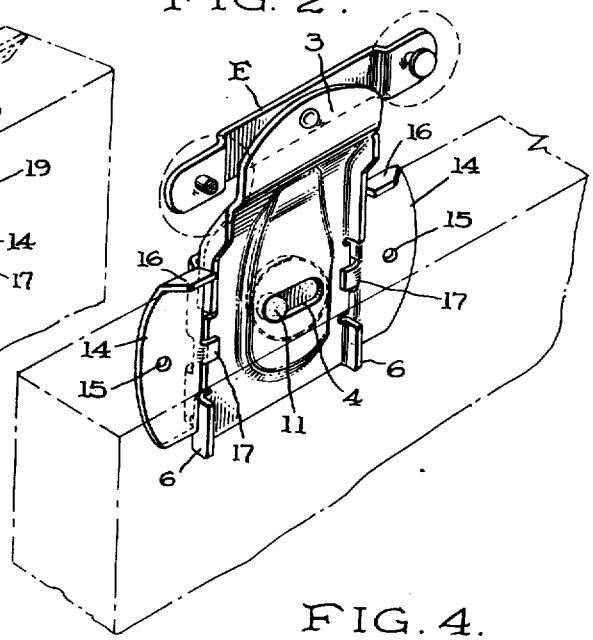
FIGURE 2 is a perspective view of the inside of the assembly shown in FIGURE 1.
Figure 6:
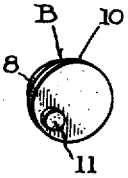
FIGURE 6 is a rear perspective view of the cam member.
Figure 4:
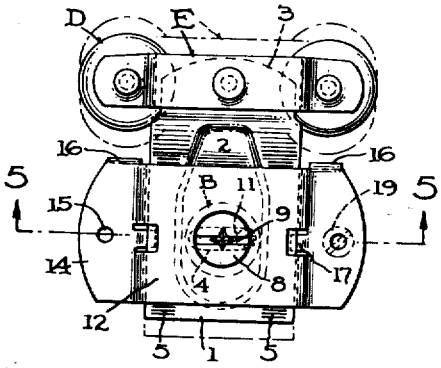
FIGURE 4 is a front elevation showing the parts in assembled relationship to each other.

The invention is of the type comprising generally three basic parts, namely a hanger A, a cam member B and an attaching plate C. The hanger A is provided near its upper edge with a pair of wheels D secured to a rocker arm E. It is understood that a single wheel could be secured to the hanger in lieu of the pair of wheels shown in the drawing without affecting the nature of the invention.

Figure 3:
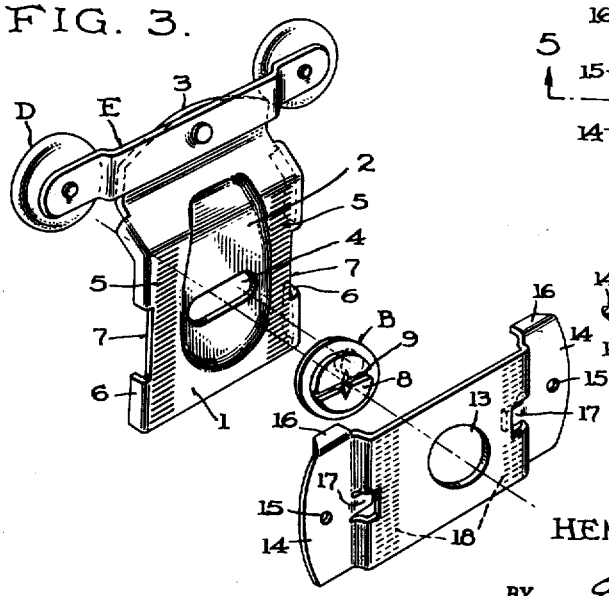
FIGURE 3 is an exploded view of the three basic parts of the assembly.
Figure 5:
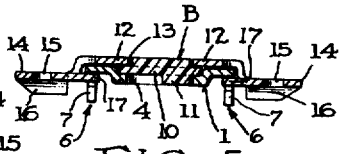
FIGURE 5 is a cross section taken on the line 5—5 of FIGURE 4.

As shown to advantage in FIGURE 3 the hanger A comprises a body 1 having a depression 2 in the central portion thereof and a neck 3 bent angularly outwardly and upwardly from the plane of the body 1. A rocker arm E with attached wheels D is pivotally secured at the top edge of the neck 3. The depression 2 in the body 1 is provided with an oblong opening 4 disposed transversely thereof, and a row of serrations 5 are formed on the outer face of the hanger body 1 on each side of the depression 2. The edges 6 of the body are bent inwardly to provide legs to space the hanger body from the door surface and are provided with notches 7.

The cam member B consists of a head 8 having a slot 9 therein, a body 10 of greater diameter than the head and concentric therewith, and an eccentrically located lug 11 projecting from the rear face of the body. The entire cam member B is preferably made of nylon but may be of any suitable plastic or metallic material.

The attaching plate C has an arched medial portion forming a pocket 12 adapted to receive the body 1 of the hanger. Said pocket is provided with a centrally located opening 13 and oppositely disposed coplanar ends 14 each provided with a fastener receiving opening 15. The upper edges of the ends 14 are turned inwardly to provide a pair of flanges 16 which serve as a positioning means during installation. A pair of retaining tabs 17 are struck out from opposite edges of the pocket 12 where the coplanar ends 14 join said pocket. Prior to assembly of the plate with the hanger, the tabs 17 extend angularly outwardly away from the attaching ends but are bent back over the edges of the body 1 of the hanger into substantially the same plane as the ends when the device is fully assembled and thus form the means for holding the component parts together. The inner face of the pocket 12 of the plate C is provided with two rows of serrations 18 which cooperate with the corresponding serrations 5 located on the outer face of the hanger A to form means for locking the parts after installation and adjustment.

The device is assembled by placing the head 8 of the cam member B in the opening 13 in pocket 12 of plate C. These two members are then placed over the outer surface of the hanger A so that the body 10 of the cam member B lies within the depression 2 in the hanger and the cam lug 11 extends into the oblong opening 4. The tabs 17 are then bent inwardly so that they overlie the inner edge of the hanger A within the area defined between notches 7. The inturned tabs thus prevent the hanger A and the plate C from separating. The spacial distance between the opposed surfaces of tabs 17 and plate 12 is slightly greater than the thickness of the hanger body but less than the height or depth of the flanged edges which form the legs 6. The cam member B is retained in assembled relationship to the hanger and plate due to the fact that its body 10 is of greater diameter than the opening 13 which prevents its withdrawal therethrough.

The hanger A, the cam member B and the attaching plate C are freely movable in relation to each other in the finished assembly so that the cam may be rotated and the hanger can slide vertically in relation to the plate member to obtain the necessary adjustment of the door.

To install the hanger unit, positioning flanges 16 of the plate are placed over the upper edge of the door and screws 19 are passed through openings 15 and tightened to the point where there is still some freedom of movement between hanger A and plate C. With the assembly thus attached to the door, the wheels D are inserted into track T and the door is suspended therefrom. The necessary vertical adjustment of the door is obtained by rotating the cam member B with a screw driver or other tool which auses the eccentric lug 11 of the cam member B to ravel transversely of the oblong opening 4 in the hanger ı and raise or lower the door through the attached plate ; as necessary to obtain proper door height. When the xact height is determined the screws 19 are tightened /hich causes the corresponding serrations 5 and 18 on he hanger and attaching plate respectively to mesh and hus provide positive means to prevent shifting of parts nd retain the door in adjusted position. It will thus be een that the invention provides a hanger assembly unit /hich may be easily and conveniently handled and intalled and provides accurate adjustment means with the dvantageous feature of locking the hanger and attaching ılate in their adjusted position.

Although the invention has been described as including . cam member B, said member could conceivably be omitıd and the door could be plumbed by loosening the attachıg screws 19 sufficiently to permit separation of the serations 5 and 18, raising or lowering the door by hand as ıecessary and then tightening screws 19 to cause the serraions to interlock and thus prevent shifting of the assemıled parts.

I claim:

1. A preassembled roller hanger unit for mounting liding doors on a track, comprising, a roller carrying ıanger body having opposite legs provided with notches ınd offset from the same side of the body to provide a pace between the inner side of the body and the door, ı door plate having door attaching ends and a medial ırched portion forming a hanger body receiving pocket, abs struck out from the plate adjacent said arched [portions] *portion* to slide in said notches, the spacial distance ›etween the opposed surfaces of said tabs and the inner ace of the plate being slightly greater than the thickness ›f the hanger body but less than the height of said legs, ınd rotatable cam means inter-engaging the hanger body ınd plate and accessible from the face of the plate for urning to adjust the relative positions of the hanger ›ody and plate.

2. A hanger unit for supporting a door for sliding movenent relative to a track secured to the top of a door ›pening, comprising, a hanger including a body having ın offset neck portion at its upper end and carrying at east one wheel for traveling in said track, said body havng medially notched side legs angularly disposed in the lirection of said wheel for engaging a door surface and .o provide a space between the inner side of the hanger ›ody and said surface, said body having a depressed porıion extending into said space and including a horizontal slot, a plate having an arched medial portion provided with an opening and forming a hanger receiving pocket, hanger positioning flanges at the upper edge of the plate for engaging the top of the door, coplanar door attaching ends extending from said plate and having fastening receiving openings, cam means having a lug entering said slot in the depressed portion of the hanger body and confined between said hanger body and the plate with a tool engaging portion exposed through said opening in the plate, means on the opposed engaging surfaces of said hanger and the arched portion of the plate adapted to be pressed into interlocking engagement when fastenings are inserted in said fastening-receiving openings of the attaching ends, and tab means on said plate adjacent said pocket and overlying opposite edges of the rear face of said hanger body, the spacial distance between the opposed surfaces of said tabs and plate being slightly greater than the thickness of the hanger body but less than the depth of the legs, whereby said plate and hanger body are connected against separation but adjustable in the direction of said legs.

*3. A preassembled roller hanger unit for mounting sliding doors on a track, comprising, a roller carrying hanger body having opposite legs provided with notches and offset from the same side of the body to provide a space between the inner side of the body and the door, a door plate having door attaching ends and a medial arched portion forming a hanger body receiving pocket, tabs struck out from the plate adjacent said arched portion to slide in said notches, the spacial distance between the opposed surfaces of said tabs and the inner face of the plate being slightly greater than the thickness of the hanger body but less than the height of said legs, and rotatable means inter-engaging the hanger body and plate for turning to adjust the relative positions of the hanger body and plate.*

References Cited in the file of this patent or the original patent

UNITED STATES PATENTS

| | | |
|---|---|---|
| 632,609 | Wilbern | Sept. 5, 1899 |
| 851,064 | Burkholder | Apr. 23, 1907 |
| 949,076 | Jacobs | Feb. 15, 1910 |
| 1,066,236 | Wells | July 1, 1913 |
| 2,710,422 | Nelson | June 14, 1955 |
| 2,999,267 | Sterling et al. | Sept. 12, 1961 |

OTHER REFERENCES

American Builder, vol. 75, No. 1, page 261, January 1953.